April 28, 1953

A. C. HAGG ET AL 2,636,381

APPARATUS FOR ANALYZING UNBALANCE OF ROTORS

Filed Aug. 10, 1949

WITNESSES:
Robert C. Bairds
James F. Young

INVENTORS
Dexter V. Wright &
Arthur C. Hagg.
BY
C. M. Avery
ATTORNEY

Patented Apr. 28, 1953

2,636,381

UNITED STATES PATENT OFFICE 2,636,381

APPARATUS FOR ANALYZING UNBALANCE OF ROTORS

Arthur C. Hagg, Pittsburgh, and Dexter V. Wright, Verona, Pa., assignors to Westinghouse Electric Corporation, East Pittsburgh, Pa., a corporation of Pennsylvania Application August 10, 1949, Serial No. 109,572

7 Claims. (Cl. 73—66)

Our invention relates to apparatus for the balancing of rotary bodies, and more particularly to apparatus for analyzing the amplitude and phase position of vibrations caused by unbalance of a rotor.

Compared with apparatus of this kind as heretofore available, it is an object of the invention to devise balance analyzing apparatus of improved accuracy and to provide a simplified and more easily operable apparatus. The significance of these objects will be appreciated from the following.

Measurements of rotor vibration amplitudes, and their phase with respect to an arbitrary angular reference on a rotor can usually be interpreted in terms of amount and angular location of unbalance mass in arbitrary planes normal to the rotor axis. One type of balancing equipment commonly used to make these measurements consists of (1) a sine-wave generator attached mechanically, electrically or optically to the rotating mass to be balanced; (2) a vibration pickup of the permanent magnet vibrating coil type to convert the pedestal or journal vibration to an alternating current voltage; and (3) a sensitive wattmeter, having one of its coils connected to the generator output circuit while the other coil is connected to the pickup output circuit.

In operation, the generator and the pickup are connected to the respective coils of a wattmeter; and a reading is obtained which is proportional to VI cos X, where V is the pickup voltage applied to the wattmeter voltage coil, I is the sine-wave generator current flowing through the wattmeter current coil, and X is the phase angle between V and I. By shifting the generator stator angularly, that is, shifting the phase angle X of the generator voltage with respect to the pickup voltage, the wattmeter can be made to read zero or a maximum. As a rule, the generator stator setting for zero wattmeter reading is used as a phase reference with suitable calibration. The vibration amount reading can be obtained by mechanically shifting the generator stator 90 degrees from the setting for zero wattmeter reading; preferably however, the generators are equipped with two windings 90 degrees apart so that vibration amount readings can be obtained conveniently by switching from one winding to the other. Two generator windings also permit a fixed setting of the generator angular position, and an equivalent procedure of measuring components along right angle axes can be carried out.

Besides permitting the measurement of phase and amount of pickup voltage, the wattmeter is effective in filtering out harmonics other than the fundamental corresponding to running frequency, provided the generator voltage across the current coil of the wattmeter is a pure sine wave. Actually, the generated voltage will have about 2% of each of the second and third harmonics, so that balancing errors are possible from higher harmonics in the vibration of the pickup. This is especially true of the second harmonic which is frequently encountered in mechanical systems and which may be quite pronounced.

It is assumed in the foregoing that the magnitude of the generator current (I) was a constant value which determined the calibration of the equipment. This means that the generator current flowing in the wattmeter coil must be manually adjusted through some device, such as a variable autotransformer, to a particular value for any given balancing speed, because the generator voltage, and hence the generator current, varies approximately linearly with speed. Unavoidable small changes in speed and inaccuracies in reading and adjusting the current meter appear as errors in the final reading.

The inductances of the wattmeter current coil, the variable autotransformer, and the generator cause a large change in the phase angle of the current with respect to the generator-induced voltage as the speed of balancing, and therefore the frequency of the voltage, is changed. Thus, the angle setting on the generator does not directly determine the phase angle of the current with respect to the rotating mass. This necessitates the use of a calibration curve of phase shift versus balancing speed. Use of the calibration curve seriously limits the accuracy of phase angle determination especially at low speeds where the slope of the calibration curve is very steep. Other disadvantages of conventional balancing equipment are the relatively large amount of power required from the generator to make the wattmeter sensitive with respect to the vibration pickup input, and the necessity for adjusting sensitivity with speed so that the scales (two scales are usually required) on the wattmeter align.

It is, therefore, among the more specific objects of the invention to reduce or eliminate the errors that may occur due to higher harmonics in the generator voltage of the known apparatus or due to voltage and current variations caused in the known apparatus by small changes in generator speed. The invention also aims at eliminating the other disadvantages mentioned in the last-preceding paragraph and to permit a smaller and less costly design than that of conventional balance analyzing equipment.

In order to achieve these objects, and in accordance with a feature of our invention, we provide rotor balancing equipment with a rectifying modulator network of the ring or bridge type and connect across one pair of its terminals a square-wave generator of constant voltage, while the other pair of network terminals is impressed by a vibration pick-up voltage smaller than the generator voltage. According to another feature of the invention, we attach a direct-current indicating instrument between the respective midpoints of two coupling members, preferably ohmic resistors, that are connected across the above-mentioned two terminal pairs respectively. According to still another feature of the invention, we design the square-wave generator so that its voltage has dead intervals of a given phase length between successive half waves of constant finite amplitude.

The above-characterized features of the invention can be realized with various types and designs of known square-wave generators such as electronic generators or oscillators controlled from a rotary sine wave generator or from photoelectric tubes. However, according to another feature of the invention, the square-wave generator of the above-mentioned balance analyzing apparatus is essentially a commutating contact inverter coupled with a source of constant direct-current voltage.

These and other features of the invention will be apparent from the following description in conjunction with the drawing in which.

Figure 1:
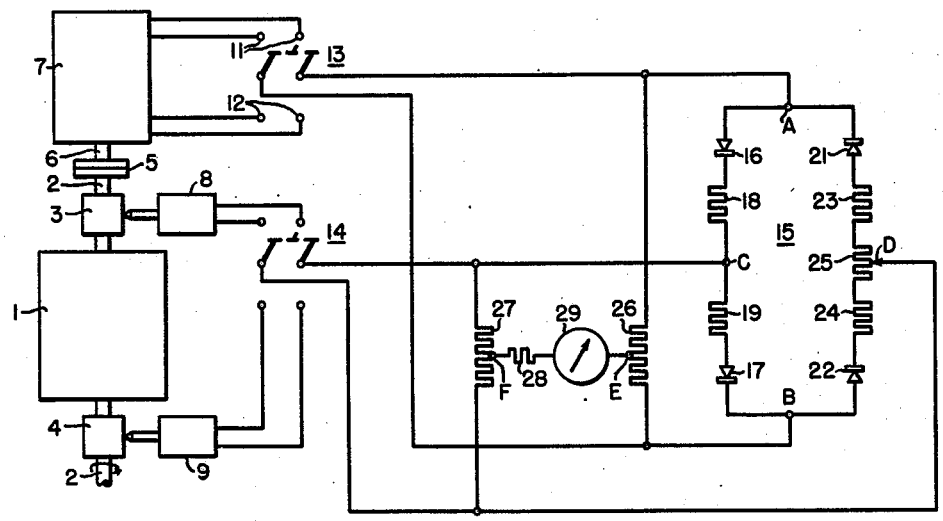
Figure 1 shows a balancing apparatus according to the invention by a schematical representation of the appertaining mechanical elements and the diagram of the vibration analyzing network.

As shown in Figure 1, the rotor 1 to be analyzed for unbalance has its shaft 2 journalled in bearings 3 and 4. The shaft 2 is driven at a selected speed by a suitable drive (not illustrated). A coupling 5 connects the shaft 2 with the shaft 6 of a generator 7 which furnishes an alternating reference voltage synchronized with the revolutions of the rotor and phase-adjustable relative thereto. The two bearings 3 and 4 are resiliently suspended by any of the suitable suspension means well known in this art and are equipped with respective vibration pickups 8 and 9. Each pickup provides a voltage which varies in accordance with the vibrations caused in the geometric planes of the respective pickups by unbalance of the rotor 1. The generator has two output circuits connected to respective terminal pairs 11 and 12. The voltages impressed across these terminal pairs are 90 degrees phase displaced relative to each other so that the suitable one may be selected by means of a switch 13. Another switch 14 is provided to connect one of the two pickups to the analyzing network at a time. The switch 14 has an intermediate off position in which neither pickup is attached to the network in order to permit calibrating the network.

The analyzing network is designed as a rectifying bridge or ring type modulator whose loop circuit, denoted as a whole by 15, has a pair of points or terminals A, B connected through the switch 13 across the selected one pair of generator terminals. The other pair of points or terminals C, D of the loop circuit 15 is connected through switch 14 across the selected pickup. Relative to points A and B across which the generator voltage is impressed, the loop circuit 15 has two parallel branches A—C—B and B—D—A. The first-mentioned branch includes two rectifying elements 16, 17 interconnected by resistors 18 and 19. Point C is the voltage midpoint of this branch. The other branch of the loop circuit includes two rectifying elements 21, 22 and two resistors 23, 24. An intermediate rheostat 25 is provided in order to permit calibrating the network for accurate bridge balance. The terminal point D is represented by the slider of the rheostat 25. Relative to the generator voltage across points A and B, the rectifying elements 16 and 17 have the same flow direction, and the rectifying elements 21 and 22 have the opposite flow direction. Consequently, during one half cycle of generator voltage, current can flow only through branch A—C—B; while during the next half period, current can flow only through the branch B—D—A.

Connected across the generator terminal points A and B of the loop circuit 15 is a coupling resistor 26. Another coupling resistor 27 is connected across the pickup terminal points C and D. The respective voltage midpoints E and F of resistors 26 and 27 are connected with each other through a resistor 28 and a direct-current instrument 29 of the milliammeter type.

Figure 3:
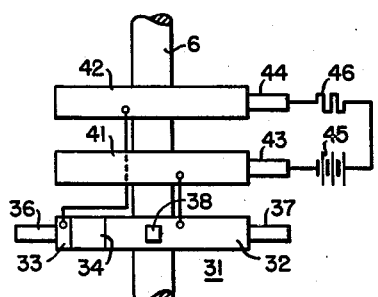
Figures 3 and 4 illustrate, respectively, a radial view and an axial view of the square wave generator of the balancing equipment shown in Figure 1.

As will be explained in the following, the analyzing network in balancing equipment according to Figure 1 will operate regardless of the particular design and voltage characteristic of the generator for supplying the alternating reference voltage, provided the generator voltage impressed across points A and B maintains a sufficient, though not necessarily constant, amplitude. However, much superior results and additional improvements are obtained with a square wave generator, especially a generator of the commutating type as described in the following with reference to Figures 3 and 4.

This generator is essentially an inverting, two-section commutator with four brushes spaced 90 degrees apart around the periphery in order to provide two voltages of 90 degrees phase displacement relative to each other. The commutator proper is denoted as a whole by 31. It has two segments 32 and 33 of conducting material insulated from each other and peripherally separated by two insulating segments 34 and 35. The appertaining commutator brushes are denoted by 36, 37, 38 and 39. Segment 32 is conductively connected with a slip ring 41, the segment 33 is connected with a slip ring 42. The slip ring brushes 43 and 44 are connected to a suitable source of constant direct-current voltage which may consist of a dry cell, battery 45, or other suitably filtered source of direct current. The connection includes a protective resistor 46 in order to prevent excessive currents during the commutation intervals.

Figure 4:
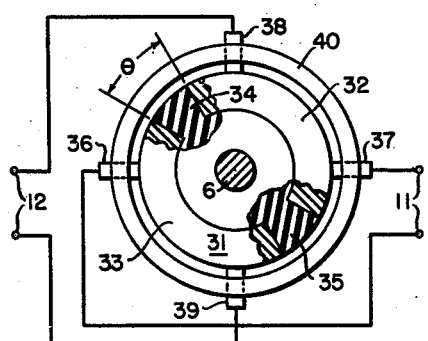
Figure 5:
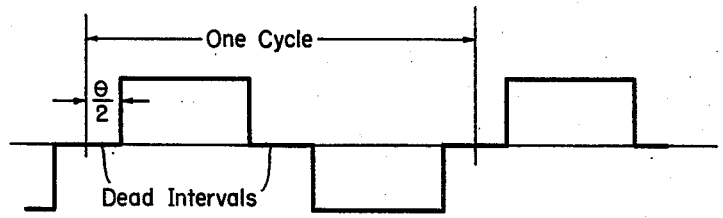
Figure 5 is the coordinate diagram of a typical voltage wave as obtained from the above-mentioned generator.

The output voltage of such a commutating generator is in the nature of the voltage wave represented in Figure 5. The positive and negative portions of such a wave are separated from each other by dead intervals whose phase angle $\theta$ corresponds to the angle $\theta$ of separation between the conductive segments 32 and 33 as indicated in Figure 4. The amplitude of the square waves is substantially constant regardless of the revolving speed of the rotor to be balanced. The four commutator brushes are rigidly interconnected by a brush ring 40 which can be angularly displaced in order to shift the phase of the generator output voltage.

The apparatus is used in much the same way as the above-mentioned known systems. After the rotor is brought up to proper speed and switches 13 and 14 are placed to connect, for instance, terminal pair 11 and pickup 8 with the analyzing network, the generator housing with its brushes is angularly displaced by the operator until instrument 29 reads zero. Then the adjusted angle of the generator housing, indicated by protracter markings, determines the phase angle of rotor unbalance in the radial plane of pickup 8 relative to a known reference position of the rotor. Thereafter, the switch 13 is shifted into engagement with terminal pair 12, and the indication of the instrument 29 is now a measure of the unbalance magnitude.

Figure 2:
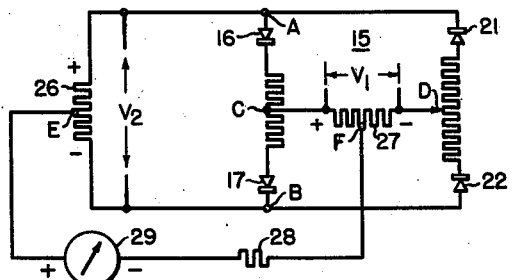
Figure 2 is a simplified showing of the same analyzing network for explanatory purposes.

The performance of the above-described balance analyzing system will be more readily understood if one first considers the performance of the analyzing electric network without paying attention to the particular design and wave shape of the reference voltage generator, assuming merely that this generator supplied an alternating voltage of constant magnitude. This generator voltage is represented in the explanatory diagram of Figure 2 by $V_2$. It appears across the coupling resistor 26 and energizes the two parallel branches A—C—B and B—D—A of the bridge circuit. The pickup voltage impressed across the coupling resistor 27 is denoted in Figure 2 by $V_1$. It will be assumed that the generator voltage $V_2$ has a value always greater than twice the maximum value of the pickup voltage $V_1$, this relation being the preferred choice of voltages for operating the apparatus. Under these conditions, and with the instantaneous voltage polarities indicated in Figure 2, the flow direction of the rectifying elements 16 and 17 is such that $V_2$ will cause a large amount of current to flow through the branch circuit A—C—B while the rectifying elements 21 and 22 prevent the voltage $V_2$ from forcing any current through the other branch. Since points E and F are both midpoint taps, they are at the same potential and voltage $V_2$ will not cause a current to flow through the meter 29. The application of the pickup voltage $V_1$ across resistor 27 will now be considered, it being recalled that this voltage is less than one-half of voltage $V_2$. Voltage $V_1$ is ineffective to pass current through either branch of the loop circuit 15. Current cannot flow from C to D through the rectifying elements 16 and 21 because these elements are poled to prevent current flow for the indicated polarity of voltage $V_1$. Although the rectifying elements 17 and 22 are properly poled for flow of current from C to D, the voltage relation of $V_1$ and $V_2$ is such as to prevent such flow. That is, since $V_1$ is less than one-half of $V_2$, point B has a larger negative potential than point D. Any current flow due to voltage $V_1$ through rectifying element 22 would have to be from point D to point B, and the polarity of the rectifying element 22 is such as to prevent such a flow. Consequently, the only circuit in which current can flow at the voltage polarities indicated in Figure 2 extends from point C through the rectifying element 17 and through point B to point E, then through meter 29 and resistor 28 to point F.

One-half cycle later, the voltages of $V_1$ and $V_2$ have reversed polarities. Under this condition, the foregoing reasoning is analogously applicable to show that the only current-carrying circuit through the meter 29 is from point D through the rectifying element 21 and through point A to point E and thence through meter 29 and resistor 28 to point F.

The direction of current flow through meter 29 is the same as described for the previous voltage polarities, i. e., meter 29 is energized by rectified current.

Referring again to Fig. 2, the condition will be considered when $V_1$ exceeds one-half the value of $V_2$. Under this condition, it is possible for some currents to flow from point F, in reverse direction, through meter 29, resistor 28, point E, and rectifying element 22 to point D. Hence, if voltage $V_1$ is more than half of voltage $V_2$, the reading of meter 29 (i. e., its current) ceases to vary linearly with the applied voltage $V_1$. It should be understood that the voltage value of $V_1$ at which the meter reading starts departing from a straight line is dependent upon the resistance value of resistor 28 with respect to the value of the total resistance in the two branches of the loop circuit. Only when the value of the resistor 28 is large compared with the resistances in the loop circuit branches, as is assumed in the foregoing, will the meter reading depart from a straight line when the voltage $V_1$ exceeds a value greater than one-half of voltage $V_2$. This condition secures good stability and sensitivity, and is obtained by making the value of the resistor 28 about 8 to 10 times that of the total resistance in loop circuit branches. If the resistance of resistor 28 is reduced considerably or omitted entirely, the non-linearity of meter reading occurs when the maximum of voltage $V_1$ exceeds the voltage $V_2$. However, stability and sensitivity are then inferior compared with the preferred resistance rating.

Assuming that the generator voltage $V_2$ is always larger than the pickup voltage, the above-described analyzing network has these phase characteristics: When voltages $V_2$ and $V_1$ are in phase, the rectified output current $I_m$ is positive and the instrument reading is a maximum. When the two voltages are 180° out of phase, the output current $I_m$ is also a maximum but it is now negative. When the two voltages are 90° out of phase, there is no output current, i. e., the instrument shows zero. In other words, the analyzer indicates only that component of the pickup voltage which is in phase with the generator voltage and thus permits obtaining a zero reading.

The foregoing explanation of the performance of the analyzing network proper was based on the assumption that the reference voltage $V_2$ maintained a constant amplitude. Turning now to the particular role which the above-described commutating generator plays in the system; it will be recognized that this generator operates as a very simple means of providing such a constant-amplitude voltage. Consequently, the vibration amount readings depend only on the magnitude of the pickup voltage, that is the reading is not dependent on maintenance of a particular value of generator current. In contrast to the previously-described known balancing equipment using a wattmeter, it is no longer necessary that the generator current and instrument sensitivity alignment be manually adjusted before taking a reading. Since the only inductance in the entire circuit is that of the vibration pickup which is in series with the very high resistance of the input voltage circuit of the analyzing network, there is practically no phase shift in the circuit. With typical components the phase shift, which is approximately directly proportional to the speed of balancing, is only 0.9 degree at 3600 R. P. M. This is a much smaller phase shift than that occurring with the conventional analyzing circuit, and would ordinarily be neglected except at very high balancing speeds. Because of the small current required by the reference input part of the analyzing network, a battery, if used as a constant voltage source (at 45 in Figure 3) has an economically long life.

Another essential advantage of the described generator-analyzer system lies in the behavior of such a system relative to harmonics of the fundamental pick-up voltages if the described system is insensitive to the second and higher harmonics, so that these harmonics, which frequently occur in balancing equipment, cannot affect the accuracy of analyzing performance. The analyzing network as such would have a small response to higher odd harmonics, and such odd harmonics may occur in the pickup voltage under some balancing conditions, especially when the balancing equipment is portable and used for balancing a rotor in its own bearings. However, an indication error due to a third harmonic in the pickup voltage is obviated by virtue of the particular voltage characteristic of the phase reference generator. As apparent from Figure 5, the generator voltage has dead or zero intervals between successive wave portions. These dead intervals have an attenuating action which greatly reduces or eliminates the rectified output current from a third harmonic in the pickup voltage while having a much lesser or negligible effect on the rectified output current due to the fundamental of the pickup voltage. This will be explained with reference to Figs. 6, 7 and 8.

Figure 6:
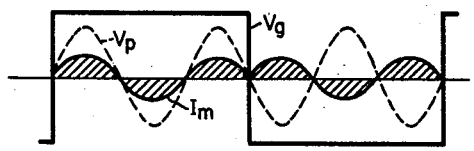
Figures 6, 7 and 8 are respective coordinate diagrams for explaining the performance of the generator.

Fig. 6 elucidates why the analyzing system would be sensitive to a third harmonic in the pickup voltage if the reference generator provided a square-wave voltage of the type exemplified by curve $V_g$. The third harmonic of the pickup voltage is represented by the wave $V_p$ and the output current flowing through the instrument branch of the network is represented by curve $I_m$. As previously explained, the output current is positive when generator and pickup voltages are in phase and negative when these two voltages are 180° out of phase. It will be seen that two of the pickup half waves within the period of each generator half wave cancel out, and that the remaining net current ($I_m$) within all generator half-wave periods has a finite positive value. Consequently, the third harmonic produces a small instrument current and thus tends to affect the accuracy of the analyzing performance. This, of course, applies also to any higher odd harmonics although to a much lesser extent.

Figure 7:
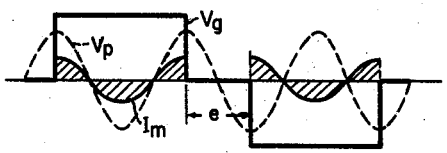

Turning now to Figure 7, the effect of a modified square-wave $V_g$ as obtained from the above-described generator will be apparent. By properly selecting the phase angle $\theta$ of the dead intervals of voltage $V_g$, the positive and negative portions of the instrument current $I_m$ caused by the third harmonic $V_p$ of the pickup voltage can be made to cancel each other within each half wave of the generator voltage $V_g$. That is, the hatched areas in Fig. 7 balance each other and hence do not yield an effective direct current in the instrument branch of the network. The angular phase length of the dead interval as shown in Fig. 7 is 60°. Such a dead interval of any phase length, of course, has also an attenuating effect on the fundamental pickup voltage, but the decrease in current due to the fundamental is only about 13% and thus not appreciable in comparison with the improvement in accuracy achieved by the elimination of current due to the third harmonic.

Figure 8:
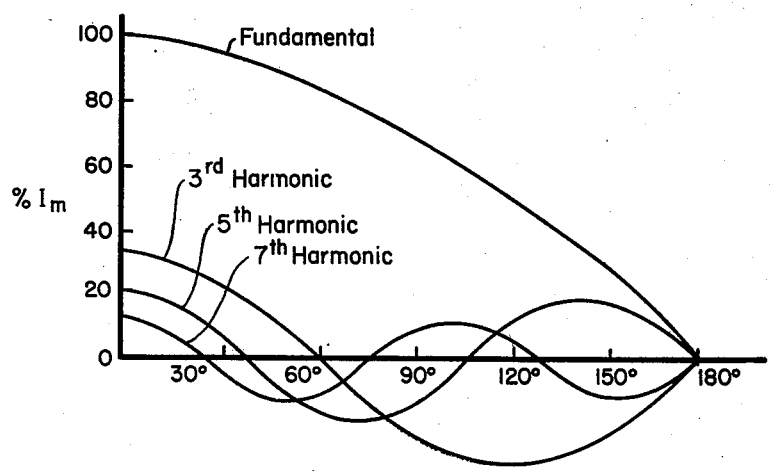

Fig. 8 shows the attenuation characteristics of the fundamental pickup voltage and its third, fifth and seventh harmonic for all dead intervals between $\theta=0°$ and $\theta=180°$.

It is evident from Fig. 8 that the dead-interval angle could be adjusted to give minimum response for all odd harmonics. However, for balancing purposes the third harmonic is virtually the only one which may appear in the pickup voltage and hence it is desirable to have a 60 degree dead-interval angle to get zero response for this harmonic.

While a 60 degree dead-interval is desirable for rotor balancing to achieve practically perfect filtering, other dead-interval angles may be preferable in other instances of vibration measurement. Hence, the commutator design should be chosen to give the dead-interval angle best suited for the particular application.

Apparatus according to the invention as exemplified by the above-described embodiment afford more accurate test results than the conventional equipment yet are relatively low in manufacturing cost and of a simple, rugged and reliable design. The application of the balance analyzing apparatus is also improved because some of the adjustments heretofore necessary before testing are eliminated and the use of phase calibration curves is no longer required except possibly on special applications.

It will be understood that an amplifier may be used, for instance, between pickup and the network and that various modifications other than those mentioned are applicable without departing from the essence of the invention and within the scope of its features as set forth in the claims annexed hereto.

We claim as our invention:

1. Apparatus for analyzing unbalance of rotors, comprising an impedance bridge network having a loop circuit with two pairs of diagonal points and four valve means individually connected between each two successive diagonal points and all poled in the same sense around said loop circuit, a vibration pickup responsive to rotor unbalance and connected across one pair of said points to impress a first voltage thereon, voltage generator means responsive to rotor revolution and connected across said other pair of points so as to impress thereon a reference voltage phase-related to the rotor revolution and always larger than said first voltage, two impedance members connected across said respective pairs of diagonal points and having each a voltage midpoint and a direct-current instrument having a circuit connected across said two midpoints.

2. Apparatus for analyzing unbalance of rotors, comprising, a substantially balanced resistance bridge having four circuit portions of ohmic resistance series-connected with one another to form a loop circuit with four diagonal points between said circuit portions, four valve means series-connected in said respective four circuit portions and all poled in the same sense around said loop circuit, a vibration pickup responsive to rotor unbalance and connected across one pair of said points to impress a first voltage thereon, a square-wave voltage source responsive to rotor revolution and connected across said other pair of bridge diagonal points to impress thereon a reference voltage phase-related to the rotor revolution, said source having a voltage amplitude always larger than that of said first voltage, two resistors connected across said respective pairs of diagonal points and having each a voltage midpoint and a direct-current instrument having a circuit connected across said two midpoints.

3. Apparatus for analyzing unbalance of rotors, comprising, a substantially balanced resistance bridge having a resistance loop circuit with two pairs of diagonal points and four valve means individually connected between each two successive diagonal points and all poled in the same sense around said loop circuit, a vibration pickup responsive to rotor unbalance and connected across one pair of said points to impress a first voltage thereon, an alternating voltage source responsive to rotor revolution and connected across said other pair of diagonal points, said source having a square-wave voltage phase-related to the rotor revolution and remaining at zero during finite intervals between positive and negative half waves of larger amplitude at said latter diagonal points than the maximum amplitude of said first voltage, two resistors connected across said respective pairs of diagonal points and having each a voltage midpoint and a direct-current instrument having a circuit connected across said two midpoints.

4. Apparatus for analyzing unbalance of rotors, comprising, a substantially balanced resistance bridge having a resistance loop circuit with two pairs of diagonal points and four valve means individually connected between each two successive diagonal points and all poled in the same sense around said loop circuit, a vibration pickup responsive to rotor unbalance and connected across one pair of said points to impress a first voltage thereon, an alternating voltage source responsive to rotor revolution and connected across said other pair of diagonal points, said source having a square-wave voltage phase-related to the rotor revolution and remaining at zero during finite intervals between positive and negative half waves of at least twice the largest amplitude of said first voltage, said source including phase-shift means for adjusting the phase position of said square wave voltage relative to said revolution, two resistors connected across said respective pairs of diagonal points and having each a voltage midpoint and a direct-current instrument having a circuit connected across said two midpoints.

5. Apparatus for analyzing unbalance of rotors, comprising an electric energy generating vibration pickup for providing an alternating current voltage in magnitude responsive to rotor unbalance, square-wave alternating-current generating means in use coupled to the rotor for providing a reference voltage phase-related to the rotor revolution, an analyzing network having two pairs of input terminals connected to the output terminals of said vibration pickup and to the output terminals of said alternating-current generating means respectively to be impressed by said two voltages and having an instrument branch electrically connected to be responsive to a component of said pickup voltage in phase with said reference voltage, said square-wave alternating-current generating means having zero-voltage intervals of finite phase length between successive positive and negative half waves to suppress the effect of odd harmonics of said pickup voltage relative to said instrument branch.

6. Apparatus for analyzing unbalance of rotors, comprising an electric energy generating vibration pickup for providing an alternating current voltage in magnitude responsive to rotor unbalance, a phase-shiftable alternating current reference voltage generating means in use coupled to the rotor, to produce a voltage selectively phase related to the rotor revolution, and being of a square-wave voltage form with zero-voltage intervals of about 60° phase length between successive positive and negative half waves, and an analyzing network having two pairs of input terminals connected to the output terminals of said pickup and the output terminals of said generating means to be impressed by said two voltages and having an instrument branch electrically connected to be responsive to a component of said pickup voltage in phase with said reference voltage.

7. Apparatus for analyzing unbalance of rotors, comprising an electric energy generating vibration pickup for providing an alternating current voltage in magnitude responsive to rotor unbalance, a rotary commutator member for connection to the rotor to revolve together therewith, said member having two peripheral contact portions insulated and circumferentially equally spaced from each other, a pair of terminals energized with direct current to thus provide a positive terminal and a negative terminal, a slip-ring connected to the positive terminal and one peripheral contact portion, a second slip-ring connected to the negative terminal and the other peripheral contact portion thereby applying direct-current voltage across said portions and brush means engaging said contact portions to derive therefrom an alternating square-wave reference voltage with dead intervals between successive half waves, an analyzing network having two pairs of input terminals connected to the output terminals of said pickup and said brush means to be impressed by said two voltages and having an instrument branch electrically connected to be responsive to a component of said pickup voltage in phase with said reference voltage.

ARTHUR C. HAGG.
DEXTER V. WRIGHT.

References Cited in the file of this patent

UNITED STATES PATENTS

| Number | Name | Date |
|---|---|---|
| 1,794,291 | Hobart | Feb. 24, 1931 |
| 1,932,033 | Dawson | Oct. 24, 1933 |
| 1,991,057 | McCloskey | Feb. 12, 1935 |
| 2,054,267 | Ohlson | Sept. 15, 1936 |
| 2,131,602 | Thearle | Sept. 27, 1938 |
| 2,213,550 | Leifer | Sept. 3, 1940 |
| 2,315,578 | Baker | Apr. 6, 1943 |
| 2,363,373 | Werner | Nov. 21, 1944 |
| 2,408,210 | Heddleson et al. | Sept. 24, 1946 |
| 2,500,013 | Svensson et al. | Mar. 7, 1950 |

FOREIGN PATENTS

| Number | Country | Date |
|---|---|---|
| 587,353 | Great Britain | Apr. 23, 1947 |